United States Patent Office 3,438,456
Patented Apr. 15, 1969

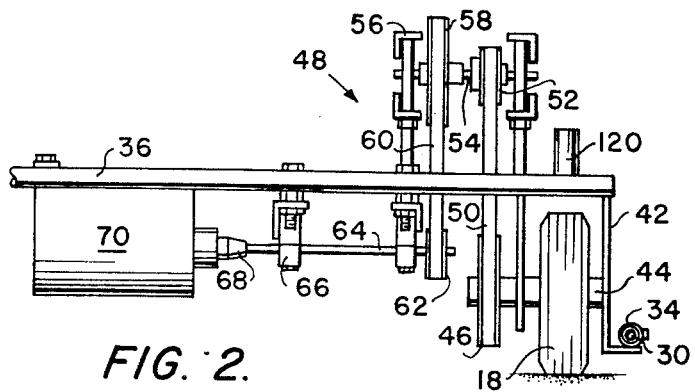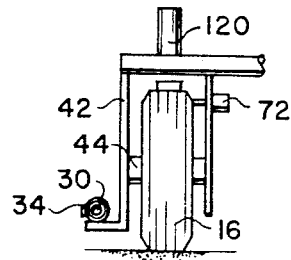
FIG. 2.
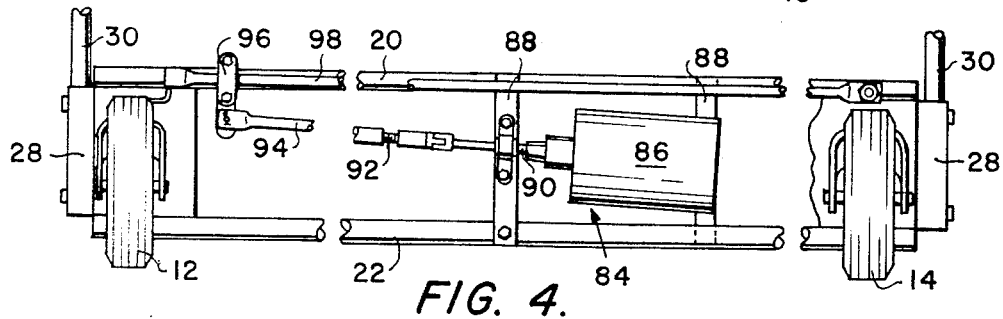
FIG. 4.
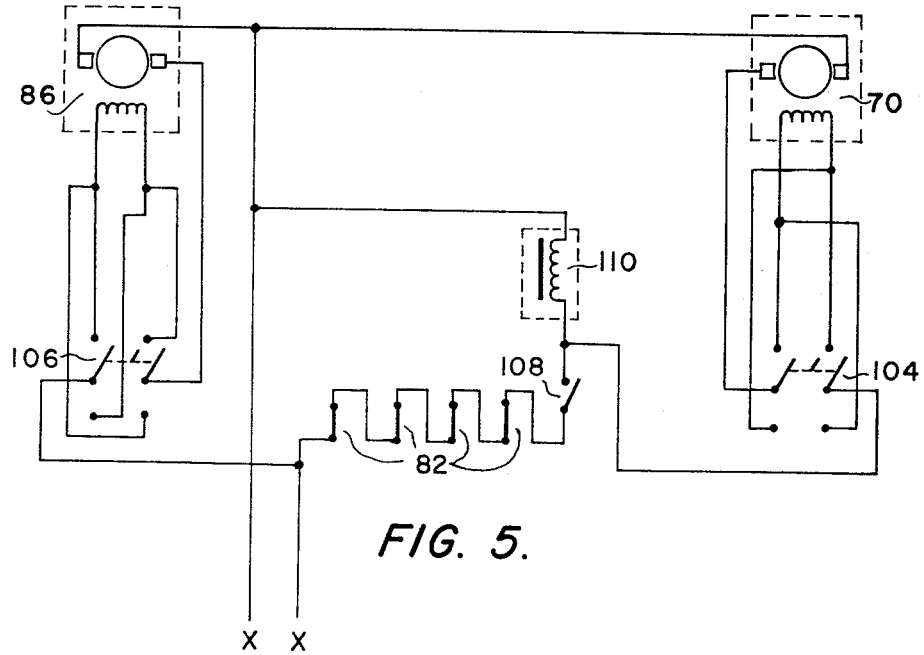
FIG. 5.

3,438,456
MOBILE CARRIER HAVING ELECTRIC DRIVING
AND STEERING MOTORS
Allen E. Hunter, 430 Halsey Ave.,
San Jose, Calif. 95128
Filed Dec. 7, 1966, Ser. No. 599,923
Int. Cl. B60k 27/08, 1/00
U.S. Cl. 180—104                             5 Claims

ABSTRACT OF THE DISCLOSURE

A self-propelled carrier for moving structures, such as erected scaffolding, having a disassembleable frame with wheels, remote controlled steering and motive power. Safety features include frame structure proximate to supporting ground level limiting tipping upon loss of wheel support, ground level sensing devices overriding remote drive control and "dead-man" braking arrangement.

---

Figure 1:
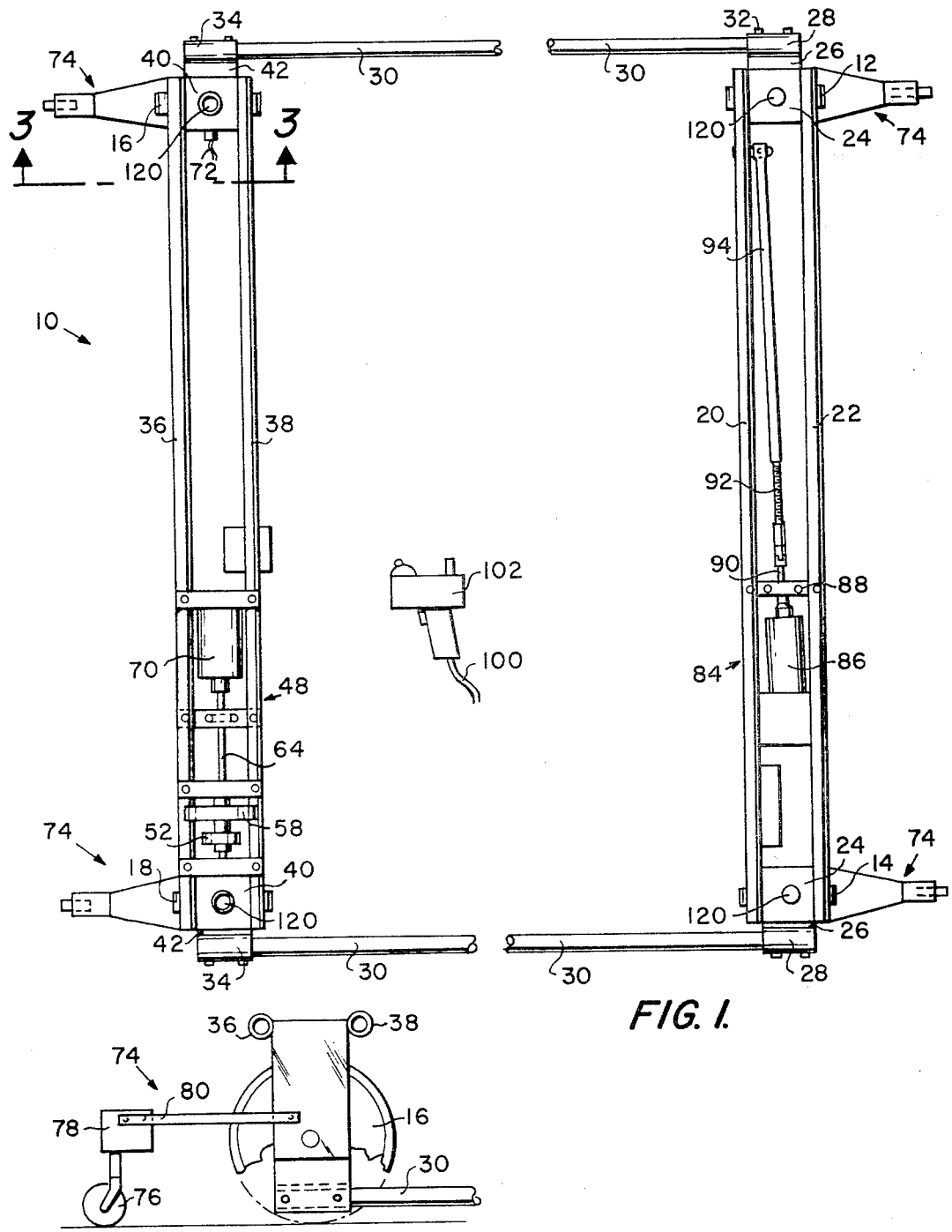

The present invention relates generally to movable supporting structures and more particularly to a self-propelled mobile carrier adapted for a plurality of mobile supporting functions.

There are innumerable occasions, particularly in the construction industry, where the movement of supplies and men is requisite. By way of example, in the construction of a framed wall, initially the carpenters and their supplies must move from one position to another; a similar requirement exists for electricians and for painters. If the wall has substantial height, the problem is compounded in that not only horizontal change of position is required, but vertical as well. Most commonly, extensive scaffolding is set up, used, and later removed but the convenience of its use is offset to a large degree by the time and expensive involved.

Recognizing these problems, certain attempts have been made to provide mobile structures; for example, movable platforms are carried on trucks for servicing of telephone and power lines but these have limited, specialized utility.

Accordingly, it is a general object of the present invention to provide a mobile carrier arranged to support supplies or personnel for movement to various desired locations.

More particularly, it is a feature of the invention to provide a mobile carrier including a balanced, self-propelled frame upon which various superstructures such a scaffolding, extensible ladders, material supply bins and the like can be detachably carried.

More particularly, it is a feature of the invention to provide such a mobile carrier including a very stable, wheel-supported structure whose stability is retained even in the event that support from any wheel is removed.

It is an additional feature of the invention to provide a mobile carrier which is self propelled under the control of an operator whether he be on or off the carrier itself.

It is an additional feature of the invention to provide a novel steering mechanism for the self-propelled mobile carrier, which mechanism also can be under the control of an operator on or off the carrier structure itself.

As an additional safety feature, braking means for the carrier are arranged to operate automatically in response to cessation of the drive mechanism.

As a correlated feature, a level sensing mechanism is attached to the carrier so as to automatically stop motion of the same in the event that a dangerous change of supporting level is about to be encountered.

It is yet another feature of the invention to provide simplified drive and steering arrangements for a mobile carrier, each of which includes a portable electric drive motor that can be detachably secured to the frame for ease of installation or replacement.

It is yet another feature of the invention to provide a mobile carrier including a frame composed of detachable elements enabling the entire frame to be quickly disassembled and stored in a relatively small space for storage or transportation purposes.

It is a related feature of the invention to provide a mobile carrier including a detachable frame structure wherein frame elements of different dimensions can be utilized thus enabling the carrying of relatively large or relatively small structures thereon.

These as well as other objects and features of the invention will become more apparent from a perusal of the following description of the structure shown in the accompanying drawings wherein:

FIG. 1 is a top plan view of a mobile carrier embodying the present invention,

FIG. 2 is an end elevational view as seen from the left of FIG. 1 and particularly illustrating details of the drive mechanism for the carrier, FIG. 3 is a fragmentary sectional view taken along line 3—3 of FIG. 1 and illustrating a level sensing mechanism, FIG. 4 is a bottom plan view of the right-hand end of the frame illustrating details of the steering mechanism therefor, and FIG. 5 is a circuit diagram illustrating the electrical controls for the drive, steering and braking mechanism for the apparatus.

With initial reference to FIG. 1, the illustrated mobile carrier includes a generally open rectangular frame 10 which is suppotred for movement by four wheels 12, 14, 16, 18 carried at the four corners of the frame so that the entire structure is movably supported substantially in parallelism to the supporting floor or other surface. More particularly, the left end member of the frame 10 has a generally rectilinear configuration and preferably consists of a pair of rigid, elongated, steel tubes 20, 22 held in slightly spaced parallelism by rectangular plates 24 welded between the two tubes at their opposite extremities. Two of the wheels 12, 14 are mounted below these rectangular plates 24 for pivotal motion about a substantially vertical axis so as to enable steering of the unit as will be described hereinafter.

At each outermost extremity of the end member, tubes 20, 22, an additional plate 26 is secured in dependent position and supports at a lower disposition, perhaps one inch above the bottom of the adjacent wheel, a tubular socket member 28 which extends substantially horizontally and at right angles to the described end member for reception of a side rail 30 which is also in the form of a rigid, elongated tube. After the tube 30 is inserted in the tubular socket 28, a pair of set screws 32 can be tightened to releasably hold the same in rectangular relationship with the end member, as clearly shown in FIG. 1.

Both of the side rails 30 are similarly secured in tubular socket members 34 rigidly supported at the opposite extremities of the second end member of the frame 10, as illustrated to the right in FIG. 1. Like the first end member, this second end member also includes a pair of elongated, rigid tubes 36, 38 secured in parallelism by rectangular plates 40 adjacent their opposite ends. Side plates 42 depend from each rectangular plate 40 at opposite sides thereof to carry a stub axle 44 which, in turn, supports the other two wheels 16, 18 for rotation but, on the other hand, do not permit pivotal motion thereof.

With continued reference to FIG. 1 and additional reference to FIG. 2, one of the axles 44 is extended to carry a pulley 46 at its inner end which provides the output of a drive mechanism generally indicated at 48. More particularly, this pulley 46 is rather large and has trained therearound a pulley belt 50 which passes upwardly and around a smaller pulley 52 mounted for rotation on an intermediate shaft 54 carried on suitable brackets 56 centrally above the end member tubes 36, 38. This shaft 54 also mounts an adjacent large pulley 58 upon which a second pulley belt 60 is trained for passage downwardly and around another small pulley 62 on a shaft 64 which is, in turn, mounted in suitable self-aligning bearings 66 carried from the end member of the frame 10. This shaft 64 is coupled to the output drive shaft 68 of a portable electric motor 70 which, because of the substantial reduction achieved through the described series of pulleys, can be a relatively small electric motor of one-third horsepower and one which can, as a consequence, be energized from a conventional 110 volt source. The motor 70 is detachably secured between the two tubes 36, 38 forming the frame end member and thus may easily be replaced when desired and furthermore, when in use, is protected because of its disposition between the two rigid tubes.

Preferably, at the opposite end of the tubes 36, 38, a conventional solenoid-actuated disc brake 72 is mounted to enable the application of braking force to the adjacent wheel 18 when the apparatus is to be stopped. Preferably, as will be described hereinafter, the drive motor 70 and the brake 72 are electrically connected in a fashion so that the brake is automatically released when the drive motor is started, and the brake is automatically applied to the wheel 18 when the drive motor is stopped. The electrical arrangement enabling this functioning will be described hereinafter with reference to FIG. 5.

Additionally, the drive motor 70 and the described brake 72 are under the control of four automatic level sensors 74, each of which is electrically connected to de-energize the drive motor 70 and apply the described brake 72 when a sudden change in level in advance of the moving apparatus is imminent. As clearly shown in FIG. 3, each level sensor 74 is in the form of a small wheel 76 mounted from a switch box 78 carried between a pair of arms 80 projecting forwardly from the adjacent wheel mounting bracket. The switch 82 (see FIG. 5) in the box 78 is normally closed but is arranged to open upon predetermined raising or lowering of the sensing wheel 76. As will be described in detail hereinafter, the opening of this switch 82 effects de-energization of the drive motor 70 and consequent energization of the brake 72 so that further progress of the apparatus will cease prior to engagement of the frame supporting wheels with the sensed impediment.

A steering mechanism generally indicated at 84, mounted on the opposite end member of the frame 10, preferably takes the form illustrated most clearly in FIG. 4 and includes a portable electric motor 86 detachably mounted between the two tubes 20, 22 by suitable mounting brackets 88. The disposition of the motor 86 is slightly angular relative to the longitudinal direction of the tubes 20, 22 and means are provided to transfer the rotary motion of the motor shaft 90 to a linear motion, such means preferably utilizing a threaded shaft 92 universally coupled to and extending forwardly from the motor shaft 90 for screwed interconnection to an interiorly-threaded connecting rod 94 so that rotation of the motor shaft effects rectilinear motion of the interiorly threaded rod 94. The end of such connecting rod 94 is connected by a clamp 96 to another rod 98 which extends under one of the frame member tubes 20 for connection at its opposite extremities to the pivoted mounting bracket for the two wheels 12, 14 so that both wheels are moved simultaneously in a clockwise or counterclockwise direction from the center dispositions illustrated in FIG. 4. Both of the steering and drive motors 86, 70 are connected through suitable cables 100 to a control box 102, as illustrated in FIG. 1, and the circuit connections are substantially as shown in FIG. 5. As there shown, both the drive motor 70 and the steering motor 86 are series wound and are connected essentially in parallel to a suitable 110 volt source. Both motors are provided with reversing switches 104, 106 in the control box 102 which enables the motors to be stopped or started in each of the two directions in a conventional fashion. The sensing switches 82 actuated by the four level sensors are normally closed switches which, upon encountering a depression or impediment in the path of the moving mobile carrier, will open, thus to break the drive motor circuit. In turn, when the main drive motor switch 108 is energized, a simultaneous energization of the brake-actuating solenoid 110 is achieved to withdraw the brake 72 from engagement with the adjacent wheel, thus to permit movement of the unit; but as soon as this circuit is opened, either through opening of the main switch 108 or one of the sensing switches 82, the drive motor 70 will be de-energized and, at the same time, the brake solenoid 110 will be de-energized so that the brake 72 will be automatically applied.

Means are provided on the frame 10 to permit the removable mounting thereon of various superstructures which are to be carried. As illustrated, four vertical pins 120 project rigidly upward from the corners of the frame to form seats for a scaffold, a table, a supply bin or any other structure which can be provided with sockets that can be received over the described pins 120. If the superstructure be a scaffold, ladder or other personnel supporting arrangement, the control box 102 can be attached to such superstructure for accessibility to the operator. Alteratively, if a supply bin is carried, the operator, in turn, can walk beside the mobile carrier with the control box 102 in his hand. Thus, broad utility is provided and it may be expressly noted that the side rails 30 of different length can be used to change the overall length of the carrier without adversely affecting its operational characteristics.

What is claimed is:
1. A mobile carrier comprising:
   at least two side rails;
   a first end member including a rigid rectangular frame having a pair of tubes in parallel spaced relationship and rectangular plates disposed between said tubes at opposite extremities thereof, two wheel assemblies secured to said frame each said assembly having inner and outer support plates downwardly depending from said frame said outer support plate being provided with a socket member for adjustably receiving and securing to said side rails and an axle carried between said support plates upon which is rotatably mounted a ground engaging wheel, electrically actuated brake means operational upon said wheels, and an electrical drive means having reversible electric motor mounted on said frame and power-transmitting means operatively connecting said electric motor and at least one of said wheels;
   a second end member including a rigid rectangular frame having a pair of tubes in parallel spaced relationship and rectangular plates disposed between said tubes at opposite extremities thereof, a downwardly depending plate at each end of said frame said plates being provided with socket members for adjustably receiving and securing to said side rails, two swiveling wheel assemblies mounted to said rectangular frame plates to pivot ground engaging wheels about vertical axes and a rod interconnecting said swiveling wheel assemblies for steerably pivoting said wheels in unison, and an electrical steering means having a reversible electric motor mounted on said frame and motion transmitting means for operatively converting rotary motion from said elec- tric motor to pivotal steering motion of said swiveling wheel assemblies; and an electrical system including a source of electrical power, cable carrying conductors for power and control currents, and a control box having a plurality of manually actuated control switches through which said electrical steering means, drive means and electrically actuated brake means are selectively energized, said brake means being continuously engaged unless said drive means is energized.

2. A mobile carrier in accordance with claim 1 in which said socket members and side rails carried thereby are in close proximity to the ground, limiting lowering or tipping of said carrier upon removal of the support of any wheel or combination of wheels.

3. A mobile carrier in accordance with claim 1 which further includes level sensing means mounted to said end members including normally closed electrical switches connected in series with said electrical drive means and ground engaging elements extending from said carrier in the direction of motion and operable to open said switches upon encountering predetermined variations in ground level.

4. A mobile carrier in accordance with claim 1 which further includes means for detachably mounting a structure to be carried by said mobile carrier.

5. A mobile carrier comprising:

at least two side rails;

a first end member including a rigid rectangular frame having a pair of tubes in parallel spaced relationship and rectangular plates disposed between said tubes at opposite extremities thereof, two wheel assemblies secured to said frame each said assembly having inner and outer support plates downwardly depending from said frame said outer support plate being provided with a socket member for adjustably receiving and securing to said side rails and an axle carried between said support plates upon which is rotatably mounted a ground engaging wheel the lower edge thereof extending about one inch below said side rails, electrically actuated brake means operational upon said wheels and an electrical drive means having reversible electric motor mounted on said frame and power transmitting means operatively connecting said electric motor and at least one of said wheels;

a second end member including a rigid rectangular frame having a pair of tubes in parallel spaced relationship and rectangular plates disposed between said tubes at opposite extremities thereof, a downwardly depending plate at each end of said frame said plates being provided with socket members for adjustably receiving and securing to said side rails, two swiveling wheel assemblies mounted to said rectangular frame plates to pivot ground engaging wheels about vertical axes the lower edge of said wheels extending about one inch below said side rails, a rod interconnecting said swivel wheel assemblies for steerably pivoting said wheels in unison and an electrical steering means having a reversible electric motor mounted on said frame and motion transmitting means for operatively converting rotary motion from said electric motor to pivotal steering motion of said swiveling wheel assemblies;

an electrical system including a source of electrical power, cable carrying conductors for power and control currents, and a control box having a plurality of manually actuated switches through which said electrical steering means, drive maens and electrically actuated brake means are selectively energized, said brake means being continuously engaged unless drive means is energized;

level sensing means mounted to said end members including normally closed electrical switches connected in series with said electrical drive means and ground engaging elements extending from said carrier in the direction of motion and operable to open said switches upon encountering predetermined variations in ground level; and means for detachably mounting a structure to be carried by said mobile carrier.

References Cited
UNITED STATES PATENTS

| | | | |
|---|---|---|---|
| 2,463,647 | 3/1949 | Schuette | 280—81 X |
| 2,513,718 | 7/1950 | Gfrorer | 180—65 |
| 2,613,756 | 10/1952 | Smith | 180—104 |
| 2,663,375 | 12/1953 | Caldwell | 280—81 X |
| 3,059,716 | 10/1962 | Iserman et al. | 180—79.1 X |
| 3,090,516 | 5/1963 | Seymour et al. | 280—91 |
| 3,305,116 | 2/1967 | McKee | 180—52 X |
| 3,344,885 | 10/1967 | Rasmussen | 182—16 |

KENNETH H. BETTS, *Primary Examiner.*

U.S. Cl. X.R.

180—65, 79.2; 280—81, 34